United States Patent
Wheeley, Jr.

[11] Patent Number: 5,353,724
[45] Date of Patent: Oct. 11, 1994

[54] ROTO-TILLER ATTACHMENT

[76] Inventor: Robert B. Wheeley, Jr., 317 Horace Ave., Virginia Beach, Va. 23462

[21] Appl. No.: 69,736

[22] Filed: Jun. 1, 1993

[51] Int. Cl.⁵ ............................................. A01C 23/02
[52] U.S. Cl. .................................... 111/128; 172/21; 111/118
[58] Field of Search .................. 111/128, 7.3, 118; 172/21, 42, 540

[56] References Cited

U.S. PATENT DOCUMENTS

| | | | |
|---|---|---|---|
| 2,384,469 | 9/1945 | Kalix | 111/128 |
| 2,975,735 | 3/1961 | Parvance | 111/128 |
| 3,478,656 | 11/1969 | McDonald | 111/128 |
| 4,109,865 | 8/1978 | Hurtado et al. | 111/128 |
| 4,192,387 | 3/1980 | Stinson | 172/21 |
| 5,178,078 | 1/1993 | Pendergrass | 111/128 |

Primary Examiner—Randolph A. Reese
Assistant Examiner—Spencer Warnick
Attorney, Agent, or Firm—Hugh E. Smith

[57] ABSTRACT

An attachment for a roto-tiller adapted to aerate and fertilize ground in preparation for seeding and planting which comprises a pair of rotatable cylinders adapted to replace the conventional tiller tines and to attach to the rotatable shaft driven by the roto-tiller unit; a plurality of spaced aerating spike members distributed uniformly around each of the cylinders; a plurality of ports or openings in each of the cylinders, the openings likewise being uniformly distributed about the external periphery of the cylinders; spring-loaded dispenser plugs positioned in the openings to be activated by each contact with the ground as the unit moves and the cylinders rotate; and dispensing valves located within the ports of the cylinders to dispense liquid fertilizer from inside the cylinders.

3 Claims, 3 Drawing Sheets

PRIOR ART

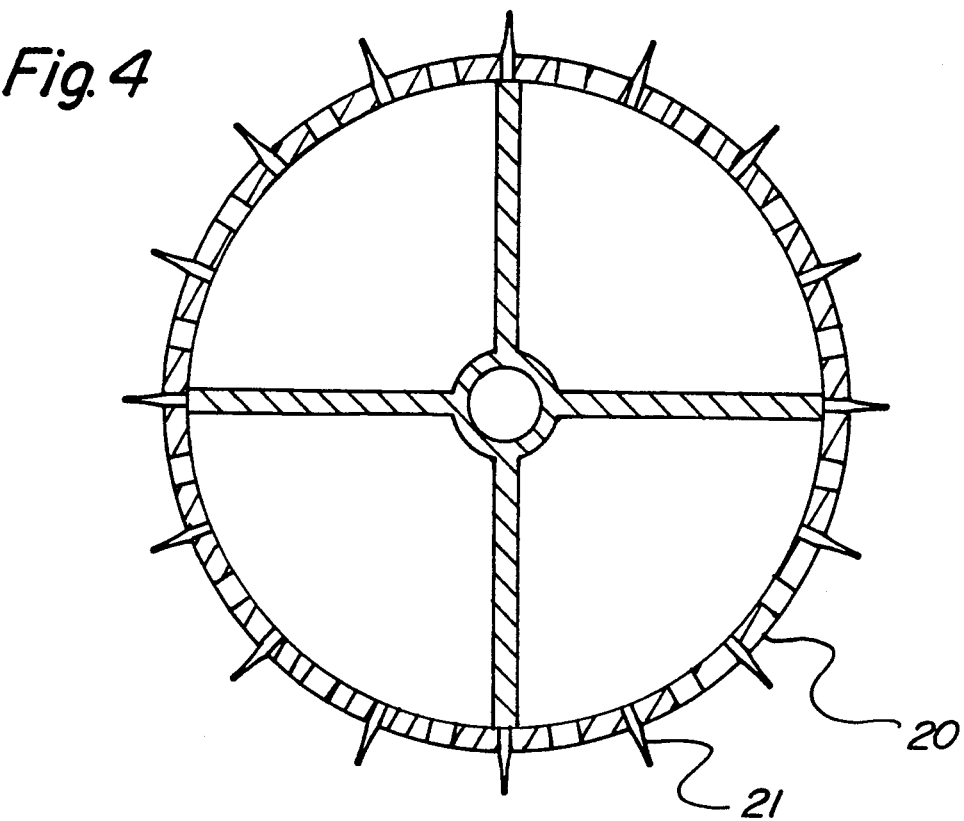
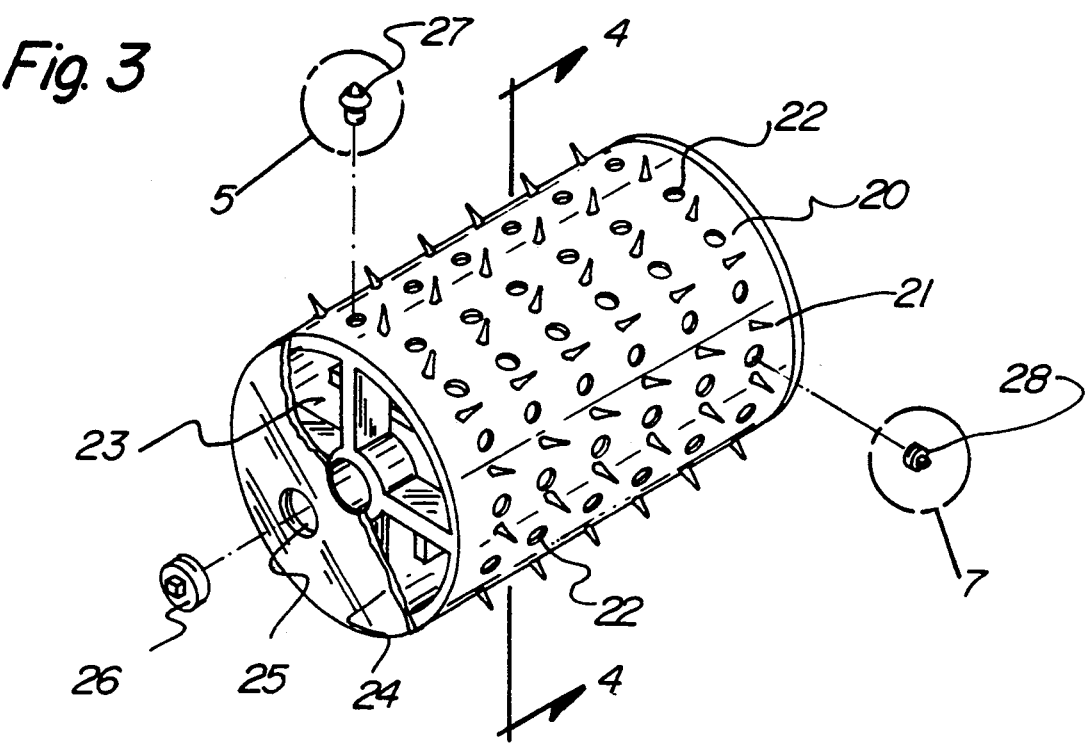

ROTO-TILLER ATTACHMENT

BACKGROUND OF THE INVENTION

1. Field of the Invention

The present invention relates to agricultural machinery and more particularly pertains to units which may be attached to the conventional roto-tiller type of apparatus.

2. Description of the Prior Art

The use of aerators is known in the prior art. More specifically, aerators heretofore devised and utilized for the purpose of opening holes in ground in preparation for planting are known to consist basically of familiar, expected and obvious structural configurations, notwithstanding the myriad of designs encompassed by the crowded prior art which have been developed for the fulfillment of countless objectives and requirements. Specifically, the present invention constitutes an improvement over the device shown in U.S. Pat. No. 4,192,387 which utilizes spiked drums for aeration. Other aerators are usually as shown in U.S. Pat. No. 4,621,697. These units perform on function only. Frequently fertilizing of the aerated ground does not take place immediately and soil compaction, rain or the like will close off many of the holes.

In this respect, the attachment according to the present invention substantially departs from the conventional concepts and designs of the prior art, and in so doing provides an apparatus primarily developed for the purpose of both aerating and simultaneously fertilizing the ground being prepared.

Therefore, it can be appreciated that there exists a continuing need for new and improved apparatus which can be used as improved soil treatment. In this regard, the present invention substantially fulfills this need.

SUMMARY OF THE INVENTION

In view of the foregoing disadvantages inherent in the known types of aerators now present in the prior art, the present invention provides an improved aerator construction wherein the same can be utilized to simultaneously fertilize the ground being prepared. As such, the general purpose of the present invention, which will be described subsequently in greater detail, is to provide a new and improved agricultural apparatus and method which has all the advantages of the prior art devices and none of the disadvantages.

To attain this, the present invention essentially comprises an attachment for a roto-tiller adapted to aerate and fertilize ground in preparation for seeding and planting which comprises a pair of rotatable cylinders adapted to replace the conventional tiller tines and to attach to the rotatable shaft driven by the roto-tiller unit; a plurality of spaced aerating spike members distributed uniformly around each of said cylinders; a plurality of ports or openings in each of said cylinders, said openings likewise being uniformly distributed about the external periphery of said cylinders; spring-loaded dispenser plugs positioned in said openings to be activated by each contact with the ground as the unit moves and the cylinders rotate; and means to introduce liquid fertilizer into the interior of said cylinders for subsequent distribution through said ports.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved roto-tiller attachment which has all the advantages of the prior art devices and none of the disadvantages.

It is another object of the present invention to provide a new and improved aerator for roto-tillers which may be easily and efficiently manufactured and marketed.

It is a further object of the present invention to provide a new and improved roto-tiller attachment which is of a durable and reliable construction.

An even further object of the present invention is to provide a new and improved roto-tiller attachment which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved agricultural device which provides in the apparatuses and methods of the prior art some of the advantages thereof, while simultaneously overcoming some of the disadvantages normally associated therewith.

Still another object of the present invention is to provide a new and improved roto-tiller aerator which will simultaneously fertilize the soil being prepared.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of one cylinder of the present invention demounted from any drive means.

FIG. 4 is a sectional view taken on line 4—4 of FIG. 3.

DESCRIPTION OF THE PREFERRED EMBODIMENT

Figure 1:
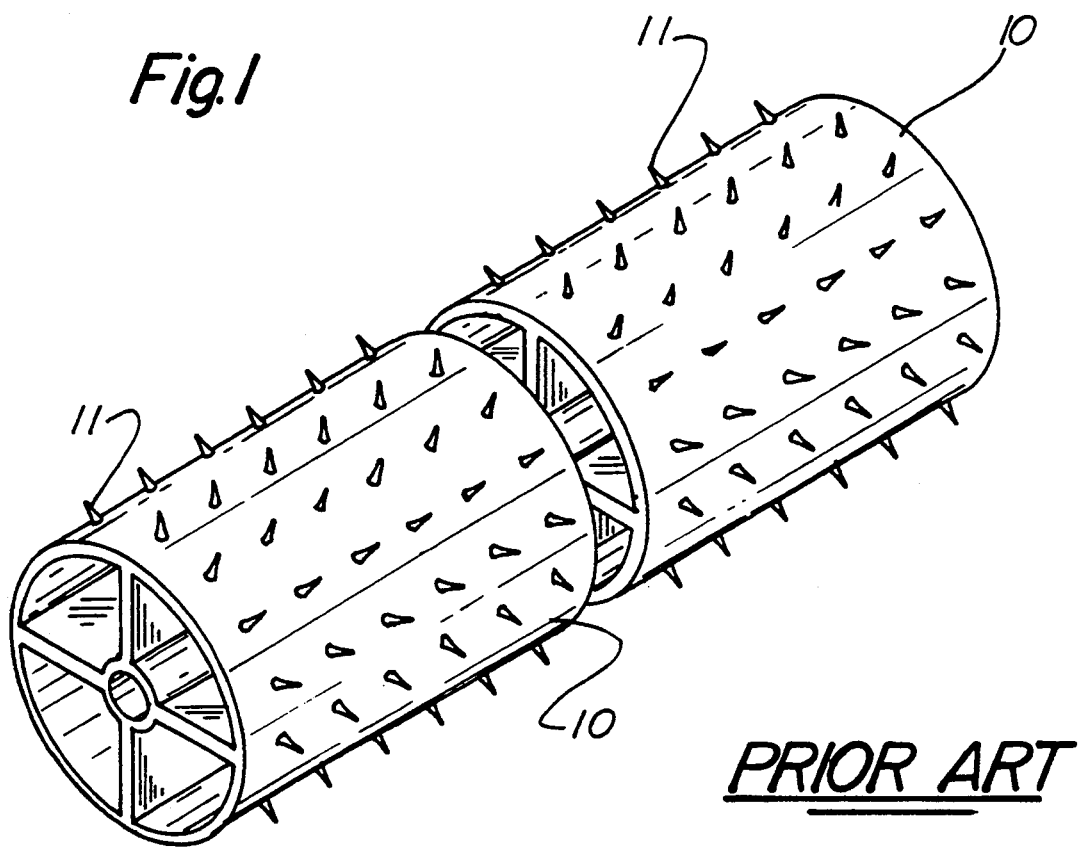
FIG. 1 shows a perspective view showing an aerator mounted on a conventional roto-tiller.

With reference now to the drawings, and in particular to FIG. 1 thereof, a new and improved roto-tiller attachment embodying the principles and concepts of the present invention will be described.

Figure 2:
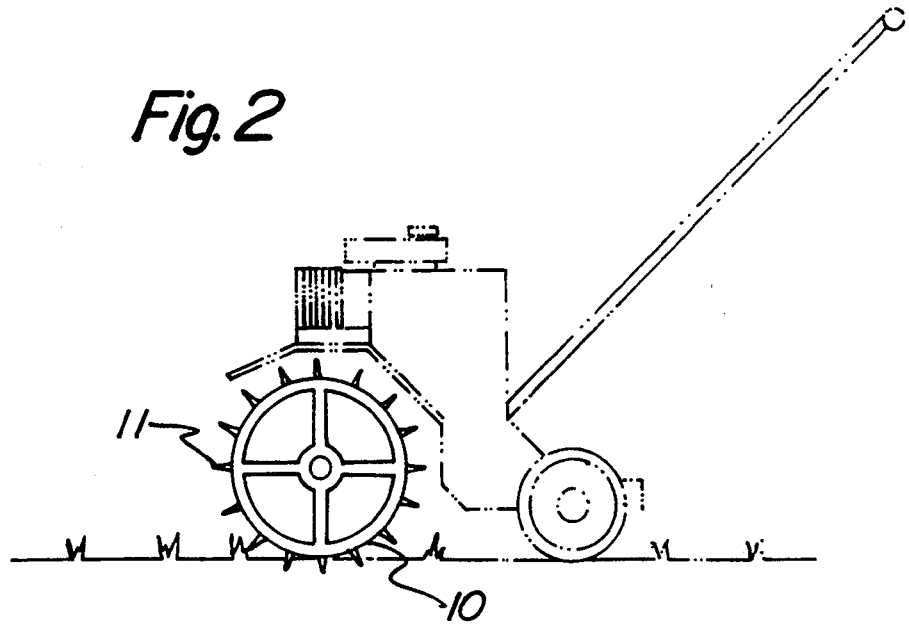
FIG. 2 shows a side view of the device of FIG. 1.

More specifically, it will be noted that referring to FIGS. 1 and 2, an aerator drum or cylinder set-up for a roto-tiller is shown, substantially as in U.S. Pat. No. 4,192,387. A pair of rotatable cylinders 10 are mounted on the rotatable drive shaft of a conventional roto-tiller (shown in broken lines on FIG. 2). Projecting from the outer periphery of such cylinders 10 are a plurality of aerating spikes 11 spaced from each other and extending uniformly around such periphery. Upon rotation of cylinders 10, spikes 11 penetrate and loosen the ground upon which the cylinder 10 rides.

FIGS. 3 and 4 show the cylinders 20 of the present invention. As in FIGS. 1 and 2 these cylinders 20 are to be mounted as a pair on the drive shaft of a roto-tiller unit. The cylinders 20 slip on to and are mounted for rotation with the drive shaft of the rotor tiller. It will be noted that similar aerating spikes 21 are provided around the periphery of the cylinder 20 and interspersed between such spikes 21 are a plurality of ports 22 extending through the outer shell of cylinder 20 and into the hollow interior 23 of cylinder 20. The ends of cylinder 20 are sealed by a closure member 24 except for an opening 25 to permit the introduction into cylinder 20 of liquid fertilizer solution (not shown). A closure plug 26 is used to seal the opening 25 drum or cylinder 20. When the device is to be used for simultaneous aeration and fertilizing, the ports 22 are closed by a plurality of spring-loaded dispenser plugs 27 (shown generally as the circled component identified by the numeral 5 and in detail in FIGS. 5 and 6 hereinafter described). When the unit is to be used for aeration only, plugs 27 are replaced by solid closure plugs 28 (shown in circle 7 on this drawing and in detail in FIG. 7, following).

Figure 5:
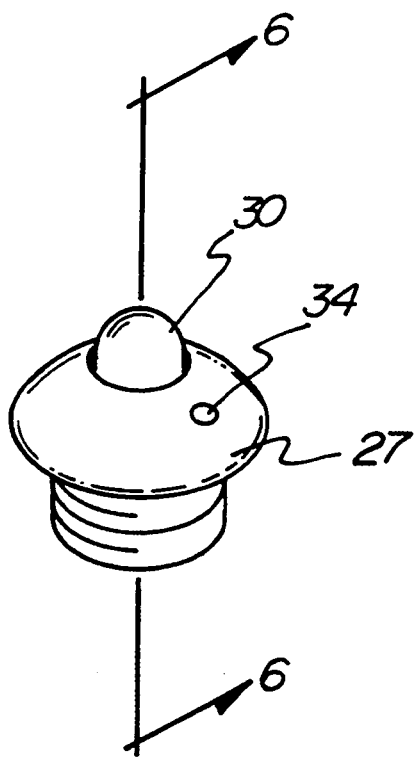
FIG. 5 is a perspective view of one of the fertilizer dispenser plugs of this invention.
Figure 6:
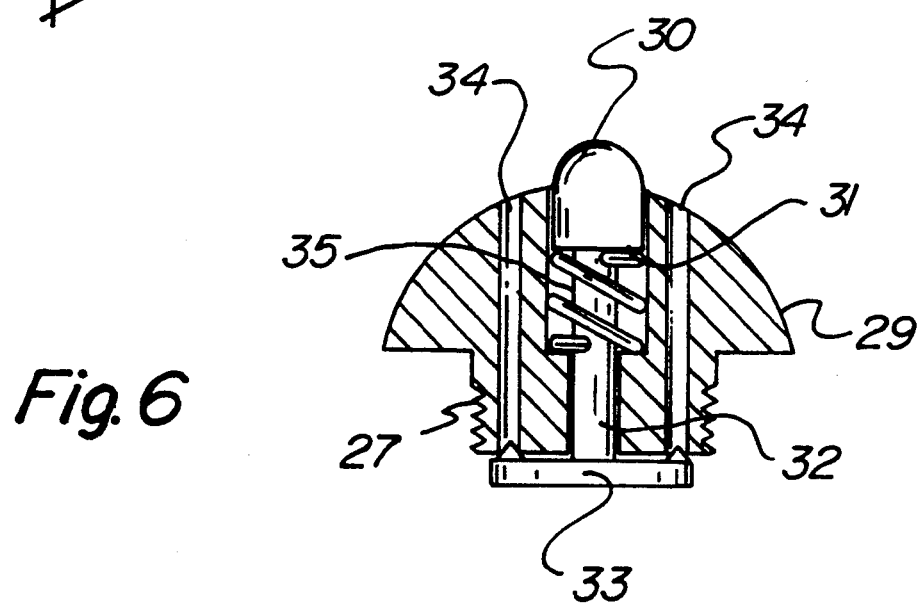
FIG. 6 is a sectional view of such plug taken on line 6—6 of FIG. 5.
Figure 7:
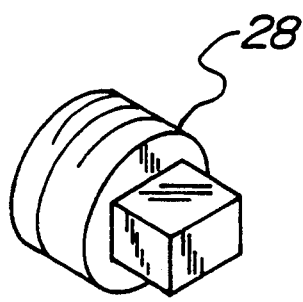
FIG. 7 is a perspective view of a sealing plug utilized when fertilization is not desired.

Referring now to FIGS. 5 and 6, the spring-loaded dispenser plug 27 is shown in more detail. Projecting from the outer surface 29 of plug 27 is a pressure-activated valve member 30. The interior surface 31 of such valve member 30 contacts or is formed integrally with a plunger member 32, at the interior end of which is a liquid sealing plate 33. Upon contact with the ground, the valve member 30 is pushed in causing plunger member 32 to move liquid sealing plate 33 inwardly permitting liquid within the cylinder 20 to pass out outlet ports 34 extending through plug 27. Because of the continued rotation of cylinder 20, upon ceasing ground contact the valve member 30 and its associated components 32 and 33 will snap shut through the urging of spring member 35. Consequently only a measured small shot or dosage of the liquid fertilizer will be dispensed by each plug 27 as cylinder 20 rotates. Entering the ground simultaneously with the aerating provided by spikes 21, such fertilizer easily and immediately is taken up by the soil being treated. As mentioned above, if no fertilization is to be done, ports 22 are closed to prevent dirt accumulation within cylinder 20 or fouling of the spring-loaded dispenser plugs 27. This is done by substituting solid closure plugs 28 as shown in FIG. 7.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved roto-tiller attachment which comprises: a pair of rotating hollow cylinders adapted to be mounted on and rotate with a drive shaft of a roto-tiller machine; a plurality of aerating spikes extending from the periphery of said cylinders and spaced there around; a plurality of ports extending through said periphery and interspersed with said aerating spikes; means to close said hollow cylinders in fluid-tight configuration; means to introduce fluid into said hollow cylinders and a means to dispense measured amounts of fluid from the interior of said cylinders, mounted within said plurality of ports, as said cylinders rotate in contact with the ground.

2. An attachment as in claim 1 wherein said means to disperse measured amounts of fluid from the interior of said cylinders comprise a plurality of spring-loaded dispenser plugs.

3. An attachment as in claim 2 wherein said fluid being dispensed is a liquid fertilizer.

* * * * *